(12) United States Patent
Renton et al.

(10) Patent No.: US 8,493,045 B2
(45) Date of Patent: Jul. 23, 2013

(54) VOLTAGE REGULATOR CONFIGURATION

(75) Inventors: Kai Renton, Trondheim (NO); Frode Milch Pedersen, Trondheim (NO); Jan Rune Herheim, Trondheim (NO)

(73) Assignee: Atmel Corporation, San Jose, CA (US)

( * ) Notice: Subject to any disclaimer, the term of this patent is extended or adjusted under 35 U.S.C. 154(b) by 201 days.

(21) Appl. No.: 12/976,049

(22) Filed: Dec. 22, 2010

(65) Prior Publication Data
US 2012/0161732 A1 Jun. 28, 2012

(51) Int. Cl.
*G05F 1/00* (2006.01)

(52) U.S. Cl.
USPC ........... 323/282; 323/284; 323/286; 323/273; 323/274; 323/277

(58) Field of Classification Search
USPC ................ 323/265, 268, 273–275, 277–279, 323/282–286
See application file for complete search history.

(56) References Cited

U.S. PATENT DOCUMENTS

| | | | | |
|---|---|---|---|---|
| 5,744,943 A | * | 4/1998 | Tokai | 323/282 |
| 5,982,160 A | * | 11/1999 | Walters et al. | 323/282 |
| 6,870,352 B2 | * | 3/2005 | Walters et al. | 323/277 |
| 6,984,969 B1 | * | 1/2006 | Liu et al. | 323/286 |
| 7,095,218 B2 | * | 8/2006 | Kobayashi | 323/282 |
| 7,990,119 B2 | * | 8/2011 | Petty | 323/273 |
| 8,368,368 B2 | * | 2/2013 | Qiu et al. | 323/282 |
| 2005/0116697 A1 | * | 6/2005 | Matsuo et al. | 323/282 |
| 2005/0179423 A1 | * | 8/2005 | Xing | 323/282 |
| 2007/0085520 A1 | * | 4/2007 | Ho | 323/282 |
| 2008/0122419 A1 | * | 5/2008 | Shimizu et al. | 323/282 |
| 2010/0134085 A1 | * | 6/2010 | Nishida | 323/285 |
| 2012/0025799 A1 | * | 2/2012 | Tournatory et al. | 323/285 |

OTHER PUBLICATIONS

Linear Regulator; http://en.wikipedia.org/wiki/Linear_regulator; Dec. 21, 2010; 6 pages.
Buck Converter; http://en.wikipedia.org/w/index.php?title=Buck_converter&printable=yes; Dec. 21, 2010; 15 pages.

* cited by examiner

*Primary Examiner* — Bao Q Vu
*Assistant Examiner* — Yusef Ahmed
(74) *Attorney, Agent, or Firm* — Fish & Richardson P.C.

(57) ABSTRACT

A voltage regulator is configurable to operate in a linear regulator mode or a buck regulator mode. To operate in the buck regulator mode, the voltage regulator is coupled to an inductor. To determine whether an inductor is coupled to voltage regulator, and thus whether the voltage regulator can be configured in the buck regulator mode, a detection circuit determines whether a regulator output of the voltage regulator resists a change in current driven to the regulator output.

20 Claims, 6 Drawing Sheets

VOLTAGE REGULATOR CONFIGURATION

TECHNICAL FIELD

This subject matter is generally related to electronics, and more particularly to voltage regulators.

BACKGROUND

Voltage regulators are used in microcontrollers and other electronic devices to supply a core voltage. One type of voltage regulator is a linear voltage regulator. Linear voltage regulators generally have low-noise characteristics and rely on only a small, low cost decoupling capacitor. Another type of voltage regulator is a buck voltage regulator. Buck regulators provide a higher power efficiency than linear voltage regulators; however, buck regulators rely on an inductor connected in series between a regulator output and a decoupling capacitor. Buck regulators are useful in low-power applications.

SUMMARY

A voltage regulator is configurable to operate in a linear regulator mode or a buck regulator mode. To operate in the buck regulator mode, the voltage regulator is coupled to an inductor. To determine whether an inductor is coupled to voltage regulator, and thus whether the voltage regulator can be configured in the buck regulator mode, a detection circuit determines whether a regulator output of the voltage regulator resists a change in current driven to the regulator output.

Particular embodiments of the invention can be implemented to realize one or more of the following advantages: (1) a buck voltage regulator may be used as a linear regulator at a relatively low cost by including in the buck voltage regulator a linear control circuit for a transistor of the buck voltage regulator; (2) a detection circuit may be included in a voltage regulator to determine whether an inductor is coupled to a voltage regulator so that control logic of the voltage regulator can configure the voltage regulator to operate in a buck regulation mode or a linear regulation mode; and (3) a voltage regulator that may be configured to operate in a buck regulation mode or a linear regulation mode can be used to supply a voltage in applications where it is not desirable to explicitly specify to the regulator a regulator configuration, for example, where the voltage regulator supplies a core voltage to a microcontroller.

DETAILED DESCRIPTION

System Overview

Figure 1A:
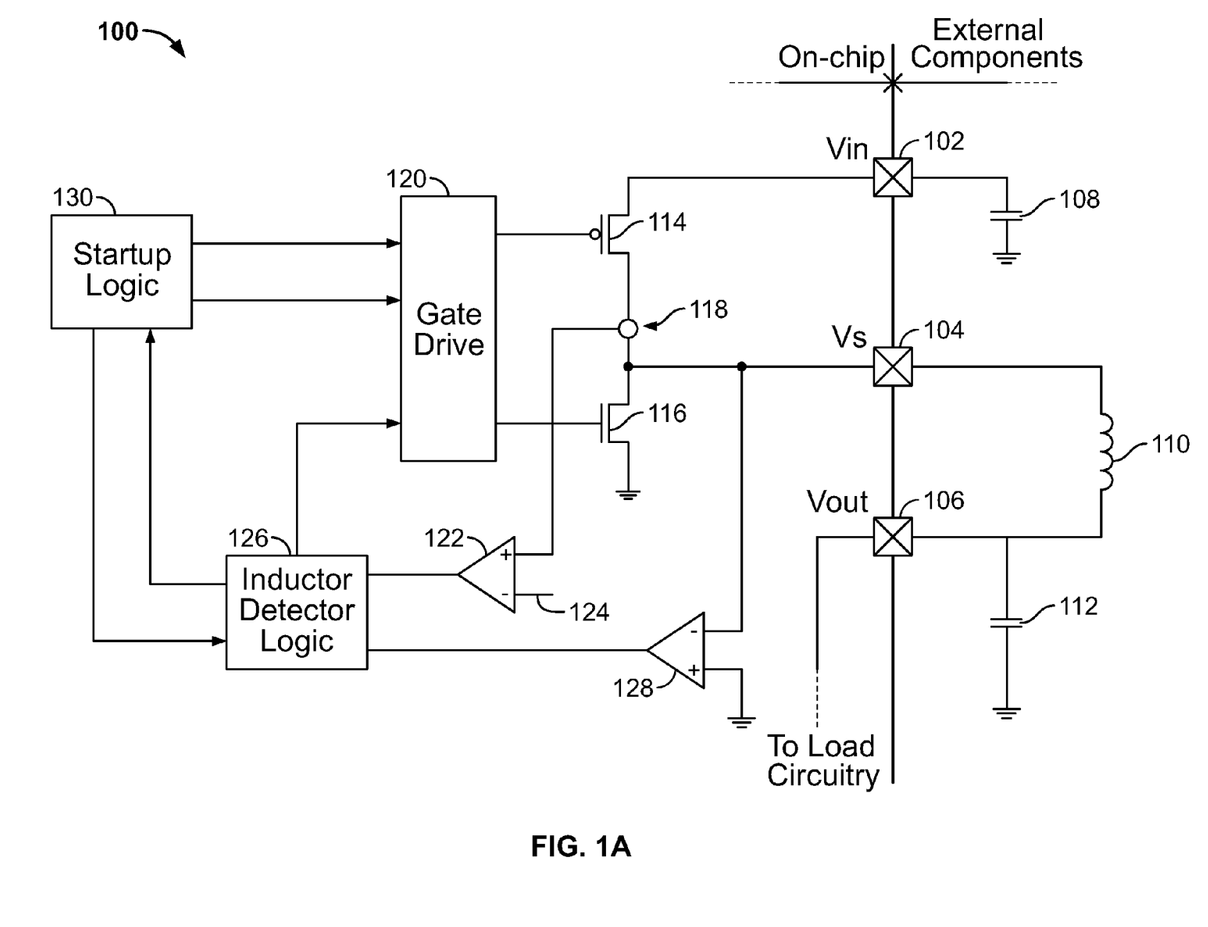
FIG. 1A is a block diagram of an example voltage regulator.

FIG. 1A is a block diagram of an example voltage regulator 100. The voltage regulator is configurable to operate in any of three modes: an inductor detector mode, a buck regulator mode, or a linear regulator mode.

A microcontroller may include the voltage regulator 100 to supply a core voltage. For example, the microcontroller may configure the voltage regulator 100 to operate in the inductor detector mode and then, depending on whether an inductor is detected, in the buck regulator mode or the linear regulator mode. The microcontroller configures the voltage regulator 100 to operate in the buck regulator mode if an inductor is detected. The microcontroller configures the voltage regulator 100 to operate in the linear regulator mode if an inductor is not detected.

The voltage regulator 100 includes three pins 102, 104, and 106 to connect to components external to the voltage regulator. A first pin 102 connects the voltage regulator to an input voltage. An input capacitor 108 may be connected to the first pin 102 and a ground. A second pin 104 provides a regulator output for the voltage regulator. The second pin 104 may connect to an inductor 110. The second pin 104 may be used to determine a configuration for the voltage regulator 100 based on whether the inductor 110 is present. A third pin 106 provides another regulator output for the voltage regulator 100. The third pin 106 may connect to a load, e.g., a microcontroller. When the inductor 110 is present, it is also connected to the third pin 106. In some implementations, a capacitor 112 connects the third pin 106 to a ground.

Figure 1B:
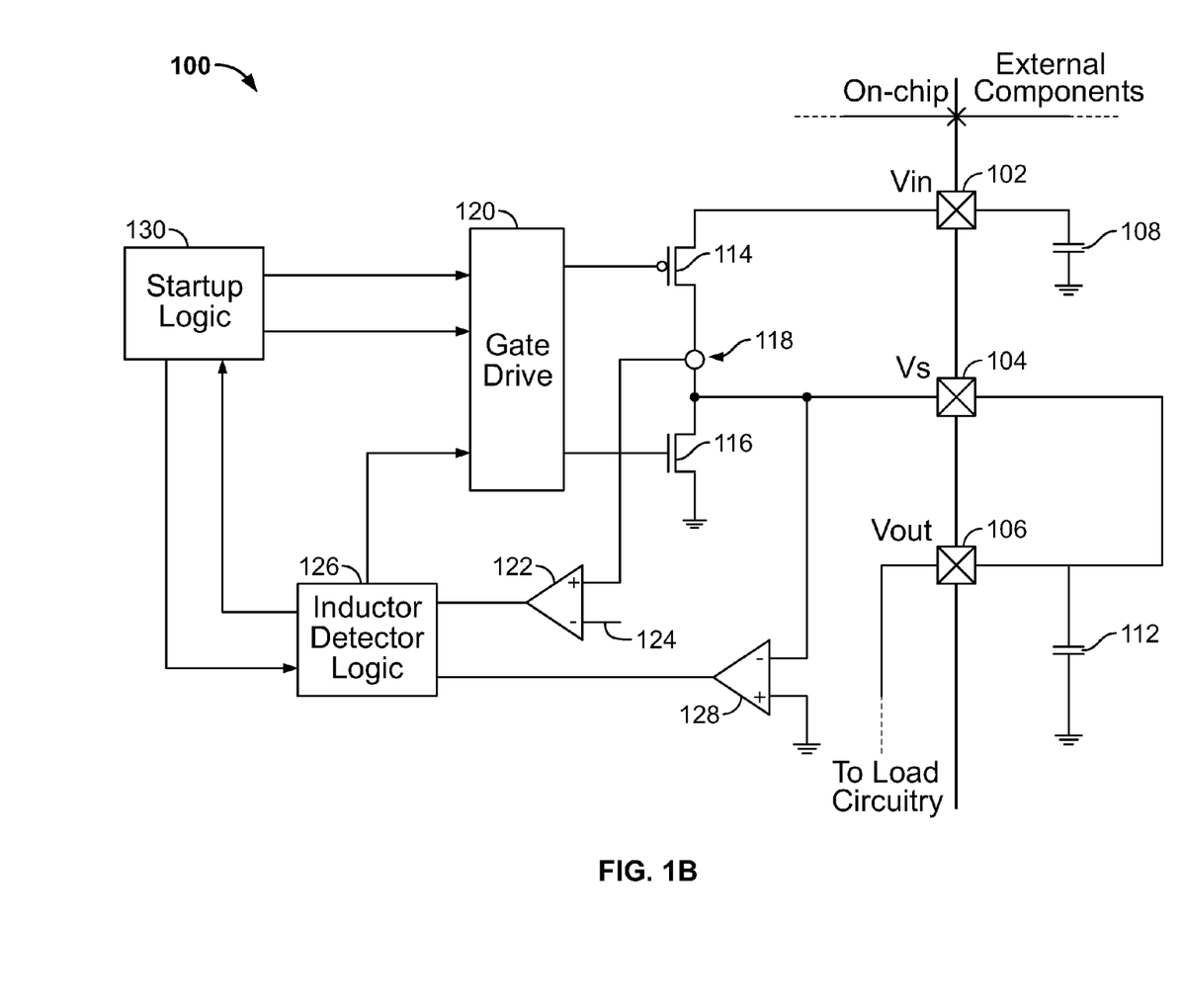
FIG. 1B is a block diagram of an example voltage regulator without an inductor connected to its output.

FIG. 1B is a block diagram of the example voltage regulator 100 without the inductor 110 connected to the second pin 104. When the inductor 110 is not present, the second pin 104 and the third pin 106 may be connected for the voltage regulator 100 to operate in the linear regulator mode.

Referring back to FIG. 1A, the voltage regulator 100 includes first and second transistors 114 and 116. In some implementations, the first transistor 114 is a pMOS transistor. In some implementations, the second transistor 116 is an nMOS transistor. A source terminal of the first transistor 114 is connected to the first pin 102. A drain terminal of the first transistor 114 is connected to an electrical node including a current sensor 118, the second pin 104, and a drain terminal of the second transistor 116. A gate of the first transistor 114 and a gate of the second transistor 116 are driven by a gate drive circuit 120. A source of the second transistor 116 is connected to a ground.

The first transistor 114 may be used during operation in the inductor detection mode to drive current to output pins. The first transistor 114 may be used during operation in the buck regulator mode to drive current to the inductor. The first transistor 114 may be used during operation in the linear regulator mode to provide linear regulation. Using the same transistor 114 in the various modes may reduce the cost and size of the voltage regulator 100.

The current sensor 118 is connected to an input of a current comparator 122. Another input of the current comparator 122 is connected to a current source 124 that provides a reference current. An output of the current sensor 118 is connected to an inductor detector logic circuit 126. The current sensor 118 may be used during operation in the inductor detection mode to signal when there is a minimum amount of current through the first transistor 114 to detect an inductor. The current sensor 118 may be used during operation in the buck regulator mode to ensure a minimum peak current through the inductor 110 to maintain efficiency for low resistance loads. Using the same current sensor 118 in both modes may reduce the cost and size of the voltage regulator 100.

The second pin 104 is connected to an input of a voltage comparator 128. Another input of the voltage comparator 128 is connected to a ground. An output of the voltage comparator is connected to the inductor detector logic circuit 126. The voltage comparator 128 may be used during operation in the inductor detection mode to determine whether the voltage at the second pin 104 goes negative, indicating that the inductor 110 is present. The voltage comparator 128 may be used during operation in the buck regulator mode to turn off the second transistor 116 when the current in the inductor 110 reaches zero to avoid reverse current flow. Using the same voltage comparator 128 in both modes may reduce the cost and size of the voltage regulator 100.

A startup logic circuit 130 configures the voltage regulator 100 into one of the three modes (inductor detector, linear regulator, and buck regulator). The startup logic circuit 130 configures the voltage regulator into the inductor detector mode by commanding the gate drive logic circuit 120 to enable the first transistor 114 and disable the second transistor 116. The inductor detector logic circuit 126 then informs the startup logic circuit 130 when the current comparator 122 indicates that the current sensed by the current sensor 118 exceeds the reference current 124. The startup logic circuit 130 then commands the gate drive circuit 120 to disable the first transistor 114. The inductor detector logic circuit 126 then captures (e.g., using a latch) the output of the voltage comparator 128, which indicates whether the inductor 110 is present or not. The inductor detector logic circuit 126 provides an indication of whether the inductor 110 is present or not to the startup logic circuit 130. If the inductor 110 is present, the startup logic circuit 130 configures the voltage regulator 100 in the buck regulator mode. If the inductor 110 is not present, the startup logic circuit 130 configures the voltage regulator 100 in the linear regulator mode.

Configuring a Voltage Regulator

Figure 2:
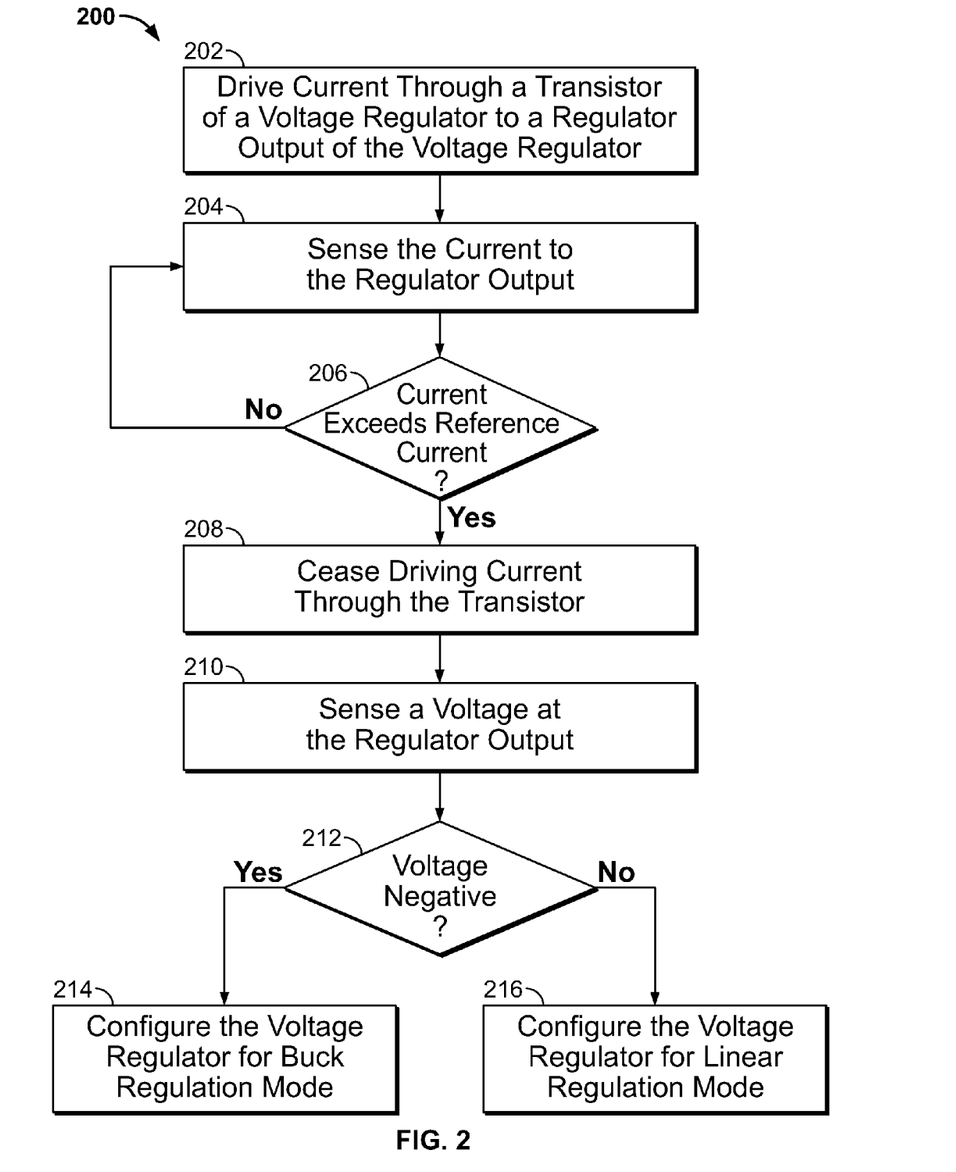
FIG. 2 is a flow diagram of an example process for configuring a voltage regulator.

FIG. 2 is a flow diagram of an example process 200 for configuring a voltage regulator. The process 200 may be performed by, for example, the voltage regulator, a device including the voltage regulator, or the device and voltage regulator in combination. For purposes of illustration, the process 200 will be described with respect to a voltage regulator that performs the process 200. The voltage regulator may be the voltage regulator 100 described above with reference to FIG. 1.

The voltage regulator drives current through a transistor of the voltage regulator to a regulator output of the voltage regulator (step 202). For example, a gate drive logic circuit of the voltage regulator may enable the transistor by providing current to a gate of the transistor. Current from an input pin may then pass from a source of the transistor to a drain of the transistor connected to the regulator output.

The voltage regulator senses the current to the regulator output (step 204). For example, the voltage regulator may sense the current using a current sensor. The voltage regulator determines whether the current exceeds a reference current (step 206). If the current does not exceed the reference current, then the voltage regulator continues to drive current through the transistor and sense the current to the regulator output.

If the current does exceed the reference current, then the voltage regulator ceases driving current through the transistor (step 208). For example, a gate drive logic circuit may disable the transistor by ceasing to drive current to a gate of the transistor.

The voltage regulator senses a voltage at the regulator output (step 210). For example, the voltage regulator may sense the voltage at an input to a voltage comparator. The voltage regulator determines whether the sensed voltage is negative (step 212). For example, the voltage regulator may use a comparator connected to both the regulator output and a ground to determine whether the sensed voltage is negative.

If there is an inductor connected to the regulator output, the voltage sensed will be negative as the inductor resists the change in current caused by ceasing driving current through the transistor. The voltage sensed goes negative because the inductor pulls current (e.g., as in FIG. 1A where the inductor 110 pulls current through the second transistor 116.) The voltage regulator may then be configured to operate in a buck regulation mode (step 214). If there is not an inductor connected to the regulator output, the voltage will not go negative. The voltage regulator may then be configured to operate in a linear regulation mode (step 216).

Two Phases for Inductor Detection

Figure 3A:
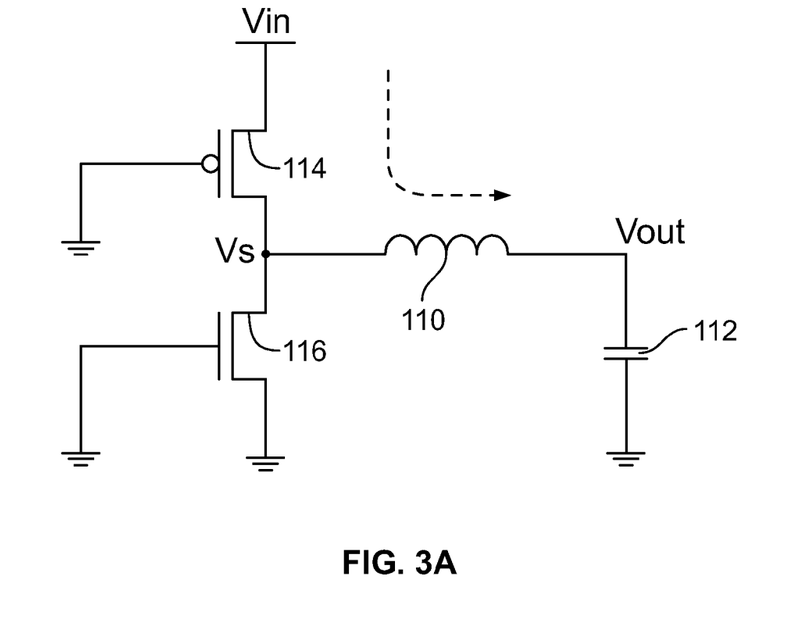
FIGS. 3A and 3B are block diagrams illustrating two phases of operation of the voltage regulator during inductor detection.
Figure 3B:
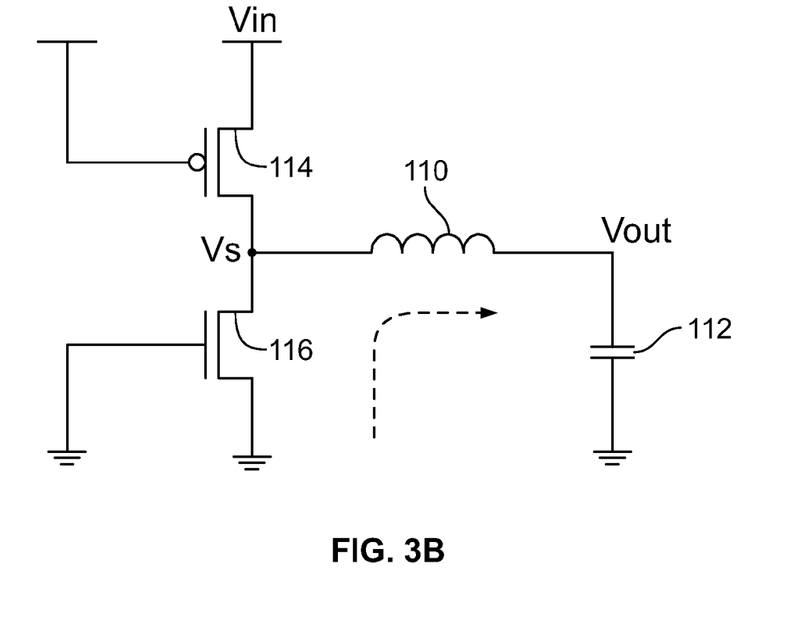

FIGS. 3A and 3B are block diagrams illustrating two phases of operation of the voltage regulator 100 of FIG. 1 during inductor detection. For example, phase 1 may correspond to steps 202-206 of the process 200 illustrated in FIG. 2, and phase 2 may correspond to steps 208-212 of the process 200.

FIG. 3A illustrates the voltage regulator 100 during phase 1. During phase 1, the voltage regulator 100 applies a current to the pin 104 that may have an inductor 110 connected. The first transistor 114 is illustrated as being enabled (e.g., as a pMOS transistor connected to a ground node.) The gate drive circuit 120 enables the first transistor 114. The second transistor 116 is illustrated as being disabled (e.g., as an nMOS transistor connected to a ground node.) If the inductor 110 is present, current flows as illustrated by the dotted arrow.

FIG. 3B illustrates the voltage regulator 100 during phase 2. The voltage regulator 100 switches from phase 1 to phase 2 when the current sensed by the current sensor 118 exceeds a reference current. During phase 2, the voltage regulator 100 ceases applying current to the pin 104. The voltage regulator disables the first transistor 114, and the inductor 110, if present, pulls the node including the pin 104 below ground so that the second transistor 116 turns on. The inductor 110, if present, resists the change in current flowing through it by drawing current through the second transistor 116 as illustrated by the dotted arrow.

Waveform Diagrams for Inductor Detection

Figure 4A:
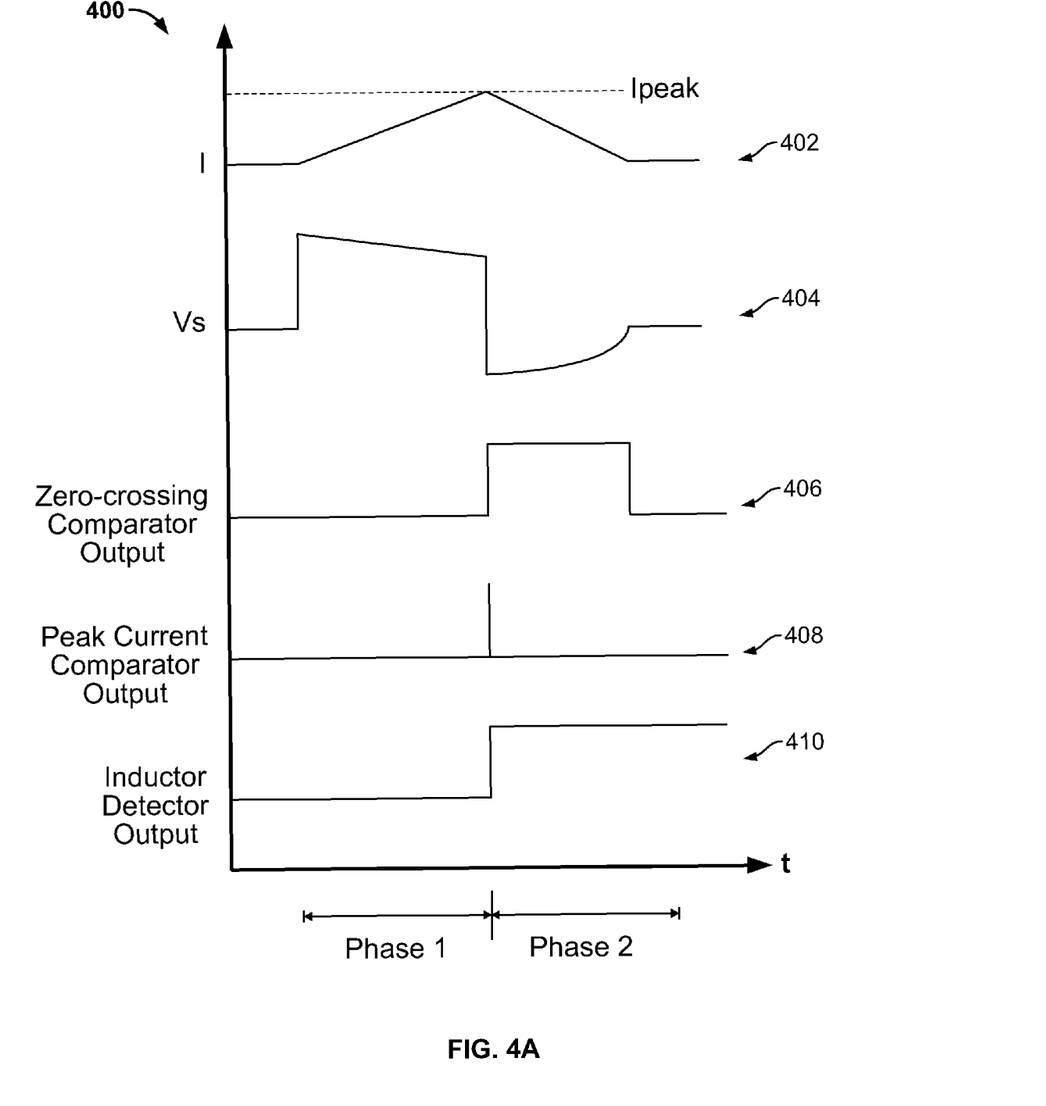
FIG. 4A is a waveform diagram showing currents and voltages of various components of the voltage regulator during two phases of inductor detection when an inductor is present.

FIG. 4A is a waveform diagram 400 showing currents and voltages of various components of the voltage regulator 100 of FIG. 1 during two phases of inductor detection when an inductor 110 is present.

A first row 402 of the waveform diagram 400 shows the current sensed by the current sensor 118. During phase 1, the current rises as the inductor 110 charges. During phase 2, the current drops gradually as the inductor 110 resists the change in current caused by the voltage regulator 100 ceasing driving current to the inductor 110.

A second row 404 of the waveform diagram 400 shows the voltage at the second pin 104. During phase 1, the voltage rises sharply as the voltage regulator 100 drives current through the first transistor 114. During phase 2, the voltage drops suddenly as the inductor 110 resists the change in current by drawing current through the second transistor 116.

A third row 406 of the waveform diagram 400 shows the voltage at the output of the voltage comparator 128. During phase 1, the voltage comparator 128 outputs a low signal indicating that the voltage at the second pin 104 is positive. During phase 2, the voltage comparator 128 outputs a high signal indicating that the voltage at the second pin 104 is negative.

A fourth row 408 of the waveform diagram 400 shows the voltage at the output of the current comparator 122. The voltage spikes when the current reaches the reference current, signaling the voltage regulator 100 to switch from phase 1 to phase 2.

A fifth row 410 of the waveform diagram 400 shows the inductor detector logic circuit 126 output to the startup logic circuit 130. The output is low during phase 1 and high during phase 2, when the inductor detector logic circuit 126 captures the output of the voltage comparator 128.

Figure 4B:
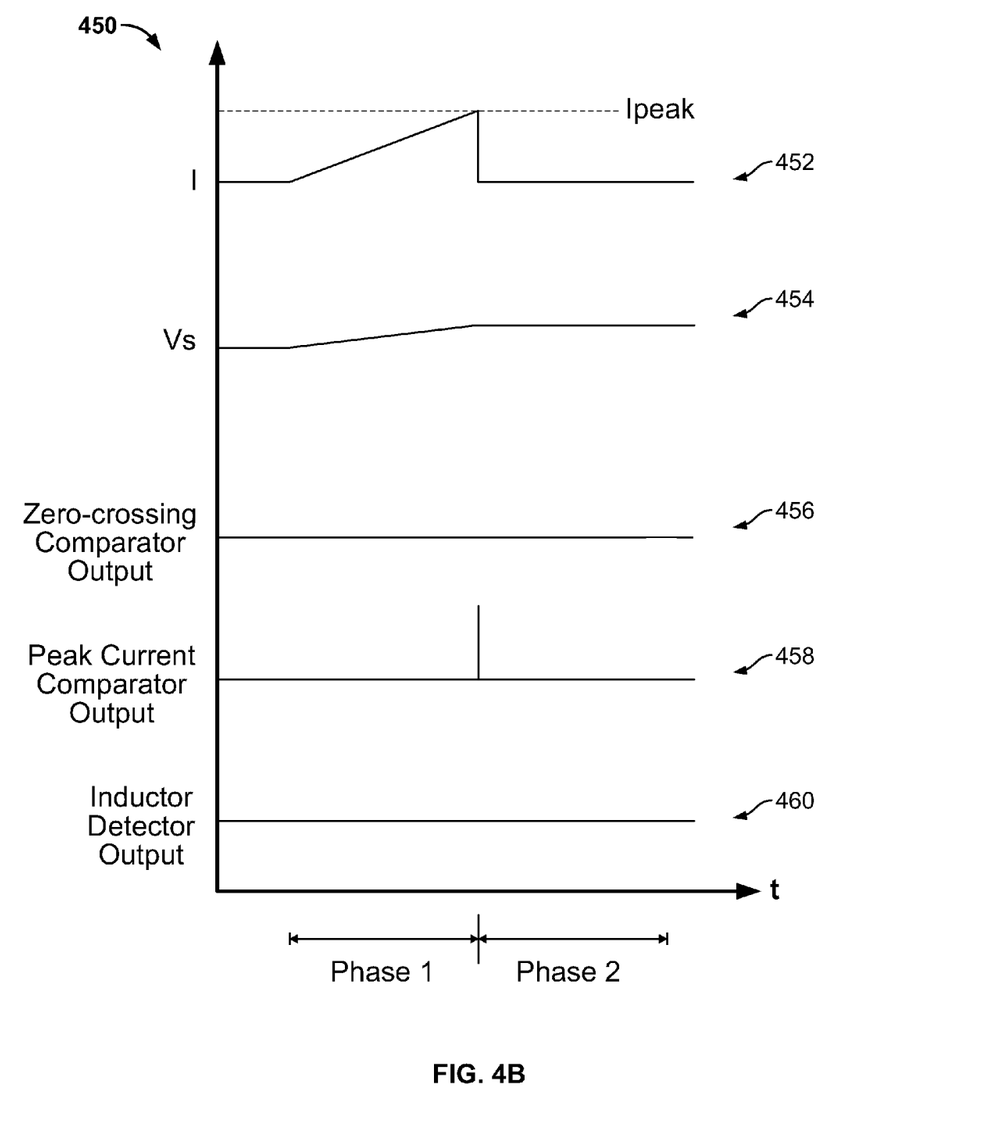
FIG. 4B is a waveform diagram showing currents and voltages of various components of a voltage regulator during two phases of inductor detection when an inductor is not present.

FIG. 4B is a waveform diagram 450 showing currents and voltages of various components of a voltage regulator 100 of FIG. 1 during two phases of inductor detection when an inductor 110 is not present.

A first row 452 of the waveform diagram 450 shows the current sensed by the current sensor 118. During phase 1, the current rises as the first transistor 114 begins driving current. During phase 2, the current drops suddenly because there is no inductor 110 to resist the change in current.

A second row 454 of the waveform diagram 450 shows the voltage at the second pin 104. During phase 1, the voltage rises slightly as the voltage regulator 100 drives current through the first transistor 114. During phase 2, the voltage does not drop below zero because there is no inductor 110 to pull current through the second transistor 116.

A third row 456 of the waveform diagram 450 shows the voltage at the output of the voltage comparator 128. During phase 1, the voltage comparator 128 outputs a low signal indicating that the voltage at the second pin 104 is positive. During phase 2, the voltage comparator 128 continues to output the low signal.

A fourth row 458 of the waveform diagram 450 shows the voltage at the output of the current comparator 122. The voltage spikes when the current reaches the reference current, signaling the voltage regulator 100 to switch from phase 1 to phase 2.

A fifth row 460 of the waveform diagram 450 shows the inductor detector logic circuit 126 output to the startup logic circuit 130. The output is low during phase 1 and remains low during phase 2, when the inductor detector logic circuit 126 captures the output of the voltage comparator 128.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A method comprising:
    driving current through a transistor of a voltage regulator to a regulator output of the voltage regulator;
    sensing the current to the regulator output and determining that the current exceeds a reference current;
    in response to determining that the current exceeds the reference current, ceasing driving current through the transistor; and
    sensing a voltage at the regulator output after ceasing driving current through the transistor to determine whether an inductor is coupled to the regulator output.

2. The method of claim 1, further comprising determining that an inductor is coupled to the regulator output and configuring the voltage regulator to operate in a buck regulator mode.

3. The method of claim 2, further comprising regulating an input voltage using the transistor to charge the inductor.

4. The method of claim 1, further comprising determining that an inductor is not coupled to the regulator output and configuring the voltage regulator to operate in a linear regulator mode.

5. The method of claim 4, further comprising regulating an input voltage using the transistor for linear regulation.

6. The method of claim 1, wherein sensing the voltage at the regulator output comprises comparing the voltage to a reference voltage.

7. The method of claim 1, wherein sensing the voltage at the regulator output comprises determining that the voltage is negative within a period of time after ceasing driving current through the transistor.

8. The method of claim 1, further comprising latching a result of sensing the voltage.

9. The method of claim 1, wherein the method is performed by a microcontroller during start-up of the microcontroller.

10. The method of claim 9, wherein the voltage regulator supplies a core voltage to the microcontroller.

11. A device comprising:
    a voltage regulator comprising a transistor and a regulator output, wherein the voltage regulator is configurable to operate in a linear regulator mode by using the transistor in its linear region and a buck regulator mode by using the transistor to charge an inductor; and
    a detection circuit configured to detect whether the regulator output is coupled to an inductor by sensing a voltage at the regulator output after ceasing driving current through the transistor.

12. The device of claim 11, wherein the device is a microcontroller, and wherein the voltage regulator is configured to supply a core voltage to the microcontroller.

13. The device of claim 11, wherein the detection circuit comprises:
    a current sensor coupled between the transistor and the regulator output;
    a current comparator comprising: a first input coupled to the current sensor, a second input coupled to a reference current source, and a current comparator output; and
    a logic circuit coupled to the current comparator output and an input of the transistor, wherein the logic circuit is configured to drive current through the transistor to the regulator output until the current comparator indicates that the current at its first input exceeds or equals the current at its second input.

14. The device of claim 11, wherein the detection circuit comprises:
- a voltage comparator comprising: a first input coupled to the regulator output, a second input coupled to a ground, and a voltage comparator output; and
- a logic circuit coupled to the voltage comparator output, wherein the logic circuit is configured to latch a signal from the voltage comparator output.

15. The device of claim 11, further comprising a different transistor coupled between the regulator output and a ground.

16. The device of claim 15, wherein the transistor is a pMOS transistor and the different transistor is an nMOS transistor.

17. The device of claim 11, further comprising a startup logic circuit configured to: determine whether the inductor is coupled to the regulator output using the detection circuit, and configure the voltage regulator in the buck regulator mode if the inductor is coupled to the regulator output or the linear regulator mode if the inductor is not coupled to the regulator output.

18. The device of claim 11, further comprising the inductor coupled to the regulator output.

19. The device of claim 18, further comprising a capacitor coupled to the inductor.

20. The device of claim 11, further comprising an electrical load coupled to the regulator output.

* * * * *